United States Patent
McBrearty et al.

(10) Patent No.: US 6,829,638 B1
(45) Date of Patent: Dec. 7, 2004

(54) SYSTEM AND METHOD FOR MANAGING MULTIPLE PROXY SERVERS

(75) Inventors: Gerald Francis McBrearty, Austin, TX (US); Shawn Patrick Mullen, Buda, TX (US); Johnny Meng-Han Shieh, Austin, TX (US); Guha Prasad Venkataraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/631,722

(22) Filed: Aug. 3, 2000

(51) Int. Cl.[7] .................. G06F 15/16; G06F 15/173
(52) U.S. Cl. .................. 709/219; 709/223; 709/203
(58) Field of Search ...................... 709/217–219, 709/227–229, 238, 203, 223–226, 245, 246

(56) References Cited

U.S. PATENT DOCUMENTS

| | | | | |
|---|---|---|---|---|
| 6,044,399 A | * | 3/2000 | Elledge | 709/220 |
| 6,185,598 B1 | * | 2/2001 | Farber et al. | 709/226 |
| 6,185,616 B1 | * | 2/2001 | Namma et al. | 709/227 |
| 6,311,216 B1 | * | 10/2001 | Smith et al. | 709/226 |
| 6,330,605 B1 | * | 12/2001 | Christensen et al. | 709/226 |
| 6,330,606 B1 | * | 12/2001 | Logue et al. | 709/226 |
| 6,389,462 B1 | * | 5/2002 | Cohen et al. | 709/218 |

* cited by examiner

Primary Examiner—David Wiley
Assistant Examiner—Joseph E Avellino
(74) Attorney, Agent, or Firm—Joseph T. Van Leeuwen; Diana Roberts Gerhardt

(57) ABSTRACT

A system and method for managing multiple proxy servers by a client computer. In one embodiment, the client computer's configuration is set to the fastest proxy server available. In another embodiment, a proxy table is accessed by the client computer to determine which proxy to use for a given web address. When a web address is included in the table, the corresponding proxy server is used to request the contents of the web address. If the web address is not included in the table, a default proxy server is used to request the information. In another embodiment, a periodic test is made to determine the speed of the current proxy server. If the speed is less than a predetermined threshold, the available proxy servers are all tested and the best-performing proxy server is selected. In another embodiment, aspects of each of the above-described embodiments are combined to provide a proxy server to a client computer based upon either a given web address (URL) or the fastest current proxy server.

29 Claims, 6 Drawing Sheets

SYSTEM AND METHOD FOR MANAGING MULTIPLE PROXY SERVERS

BACKGROUND OF THE INVENTION

1. Technical Field

The present invention relates in general to a method and system for providing multiple paths to a computer network. More particularly, the present invention relates to a method and system for client computers to use multiple proxy servers in accessing web sites on the Internet.

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. Computer systems typically include a system processor and associated volatile and non-volatile memory, a display area, input means, and often interfaces, such as a network interface or modem, to other computing devices.

One of the distinguishing characteristics of these systems is the use of a system board to electrically connect these components together. These computing devices are information handling systems which are designed primarily to give independent computing power to a single user, or a group of users in the case of networked computer systems. Personal computing devices are often inexpensively priced for purchase by individuals or businesses. Nonvolatile storage devices such as hard disks, CD-ROM drives and magneto-optical drives are also considered to be peripheral devices. Computer systems are often linked to other computing systems using a network, such as a local area network (LAN), wide area network (WAN), or other type of network such as the Internet. By linking to other computers, a computer system can use resources owned by another computing device. These resources can include files stored on nonvolatile storage devices and resources such as printers.

Servers perform different services for client computer systems. Web servers often provide content, or information, to client computers. Another type of server used by client computers is known as a "proxy server." In an enterprise that uses the Internet, a proxy server is a server that acts as an intermediary between a client computer system and the Internet so that the enterprise can ensure security, administrative control, and caching service. A proxy server is associated with (or is part of) a gateway server that separates the enterprise network (often a local area network (LAN)) from the outside network (i.e., the Internet) and a firewall server that protects the enterprise network from outside intrusion.

A proxy server receives a request for an Internet service (such as a Web page request) from a user of a client computer system. If it passes filtering requirements, the proxy server (assuming it is also a cache server) checks Web pages that were previously downloaded by the proxy server. If the page is found, the proxy server returns the requested page to the user without needing to forward the request to the Internet. If the page is not in the cache, the proxy server, acting as a client on behalf of the user, uses one of its own IP addresses to request the page from the server out on the Internet. When the page is returned, the proxy server relates it to the original request and forwards it on to the user.

To the user, the proxy server is invisible; all Internet requests and returned responses appear to be directly with the addressed Internet server (i.e., Web server). (The proxy is not quite invisible; its IP address has to be specified as a configuration option to the browser or other protocol program.)

The functions of proxy, firewall, and caching can be in separate server programs or combined in a single package. Different server programs can be in different computers. For example, a proxy server may be in the same machine with a firewall server or it may be on a separate server and forward requests through the firewall.

Because of the role they play, proxy servers can be extremely busy machines. When a proxy server is too busy, it cannot efficiently handle all requests received from users. When this happens, the users have to wait for both the proxy server and the ultimate Web server to process the request, thus delaying the arrival of information at the user's computer system.

More and more proxy servers are available to users. Many of these users have access to more than one proxy server. However, switching between available proxy servers often involves configuring the client computer system to direct requests to a different proxy server. A challenge in the current art, therefore, is switching between multiple available proxy servers based upon a given criteria.

In addition, one available proxy server may provide increased security when accessing confidential information, such as a client's banking information, while another proxy may provide better general throughput or have a larger caching area to store documents of general public interest. A challenge with the prior art exists in correlating proxy servers with particular web addresses (URLs).

What is needed, therefore, is a method for automatically switching between two or more proxy servers based upon various conditions, or events, occurring in the system.

SUMMARY

It has been discovered that providing a system and method for switching between multiple proxy provides a more efficient flow of data from servers to client computer systems. In one embodiment, the available proxy servers are automatically evaluated to determine the fastest proxy server available. The client computer system then automatically changes its configuration to direct requests to the fastest proxy server.

In another embodiment, a proxy table is accessed by the client computer to determine which proxy to use for a given web address. When a web address is included in the table, the corresponding proxy server is used to request the contents of the web address. If the web address is not included in the table, a default proxy server is used to request the information.

In yet another embodiment, a periodic test is made to determine the speed of the current proxy server. If the speed is less than a predetermined threshold, the available proxy servers are all tested and the best-performing proxy server is selected. In another embodiment, the above-described embodiments are combined to provide a proxy server to a client computer based upon either a given web address (URL) or the fastest current proxy server.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken, to be limiting of the invention itself. Rather, any number of variations may fall within the scope of the invention which is defined in the claims following the description.

Figure 1:
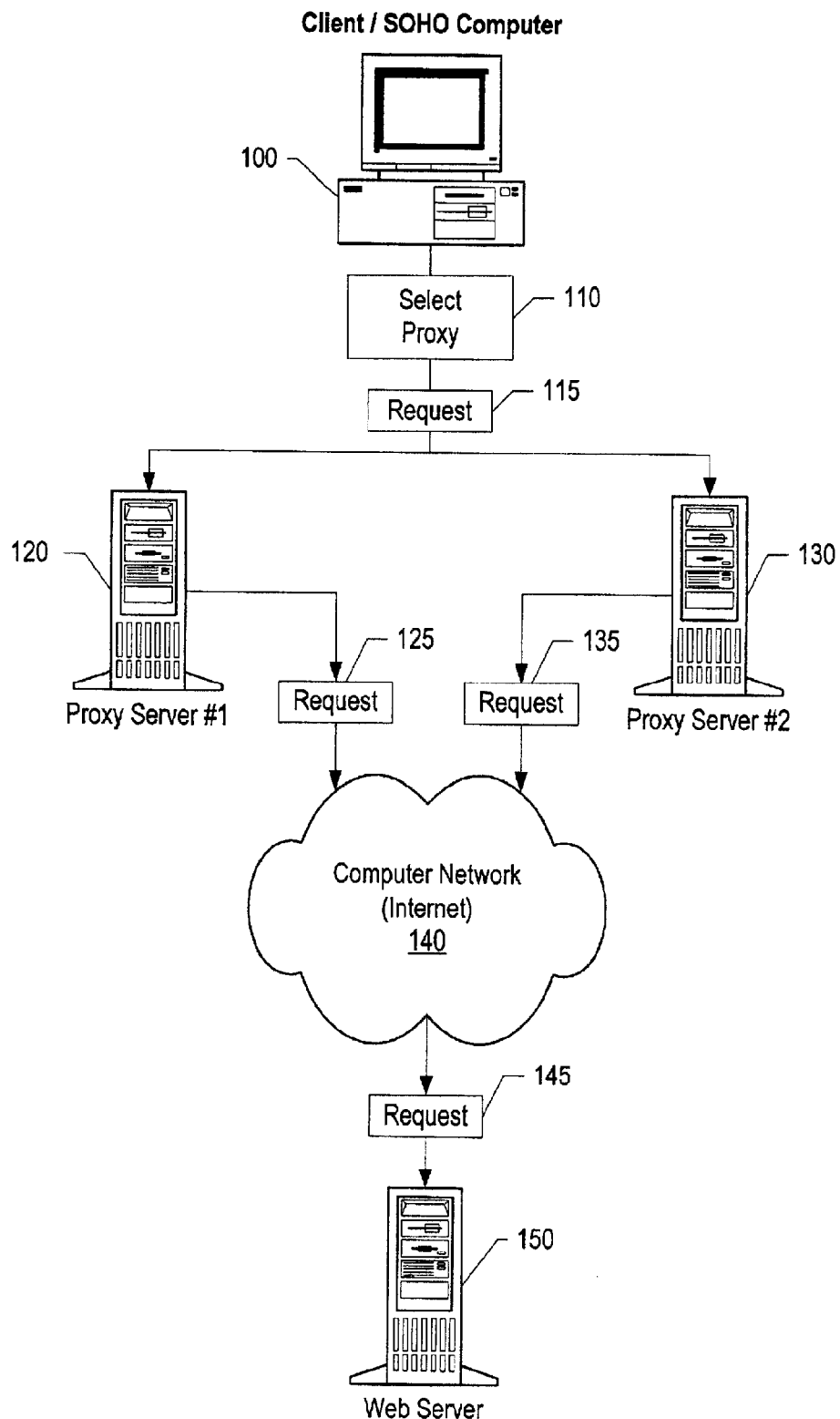
FIG. 1 is a block diagram of a client computer managing the use of multiple proxy servers.

FIG. 1 shows a block diagram of client computer system 100 selecting between proxy servers. Two proxy servers, proxy server #1 (120) and proxy server #2 (130) are shown. However, more than two proxy servers may be utilized in the proxy selection described herein. Client computer system 100 runs selection routine 110 to select the proxy server to use to send request 115 to a destination address in computer network 140. One example of computer network 140 is the Internet. Selection routine 110 selects the proxy server to use based upon a predetermined algorithm. FIGS. 2–5 detail various algorithms that may be implemented in selection routine 110.

Once selection routine 110 has selected a proxy server, or more specifically the network address corresponding to the selected proxy server, request 115 is sent to either proxy server #1 (120) or proxy server #2 (130). If request 115 is sent to proxy server #1 (120), then the proxy server sends request 125 to network 140 in order for server computer system 150 to receive and process the request. On the other hand, if proxy server #2 (130) was selected, request 135 is sent to network 140 and processed by server computer system 150. Request 115 identifies client computer system 100 as the requester, whereas request 125 and request 135 identify the requester as proxy server #1 (120) and proxy server #2 (130), respectively. Request 145 is the same as either request 125 or request 135, depending upon which proxy server sent the request. In this manner, the network address (i.e., IP address) of client computer system 100 is not disclosed to server computer system 150.

Figure 2:
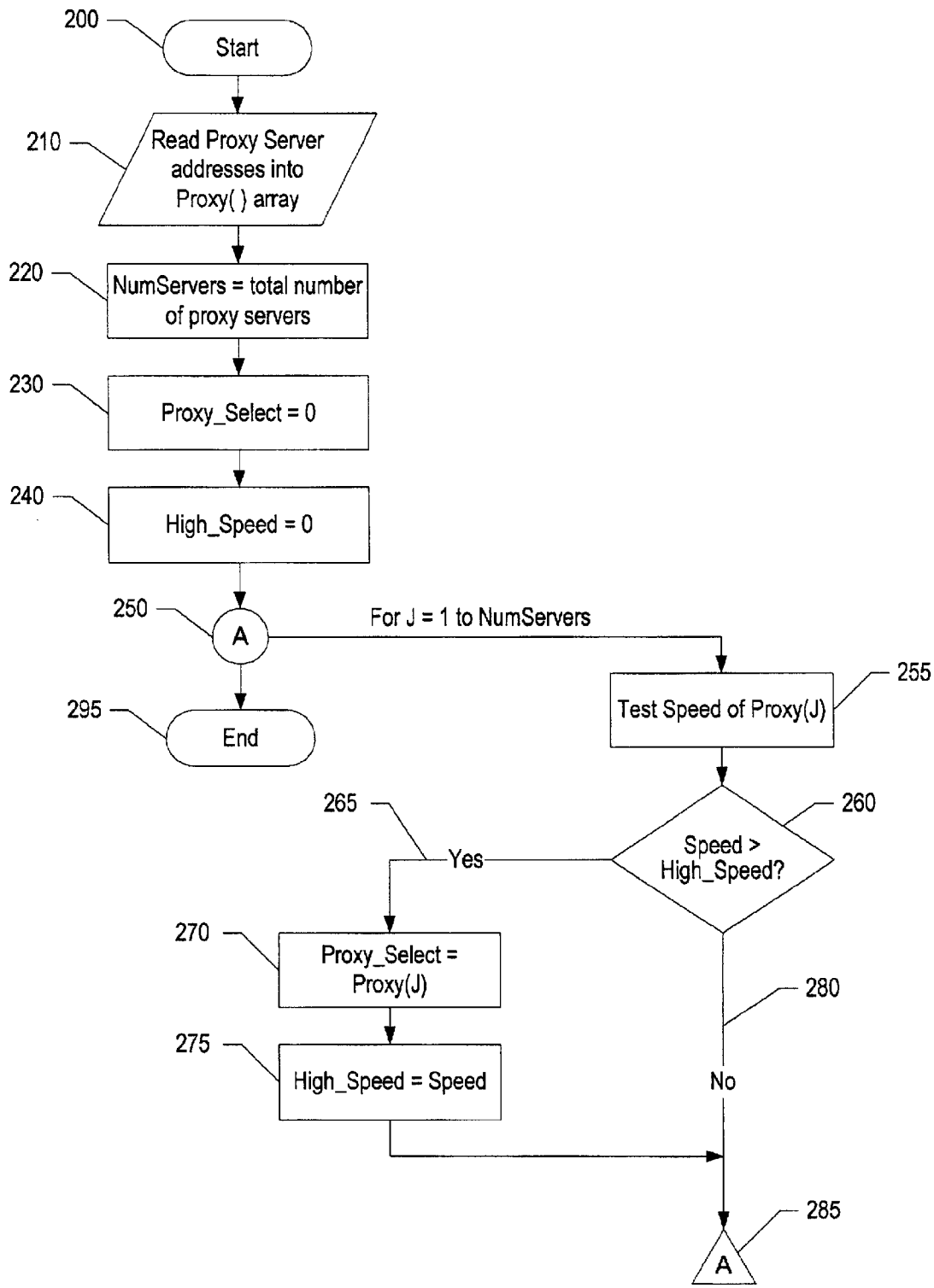
FIG. 2 is a flowchart of a client computer choosing a proxy server based on proxy speed.

FIG. 2 shows a flowchart of one embodiment of selecting between proxy servers based upon the speed of the proxy server. Ideally, this determination is made during the initialization of the client computer system so that the fastest proxy server is known before the user requests information from the network. The flowchart commences at 200 whereupon information about the proxy servers available to the computer system is read and stored in an array (input 210). The proxy server information is stored in an array named Proxy( ). The total number of available proxy servers is determined based on the number of proxy server records read (step 220). The variable Proxy_Select is initiated and set to 0 (zero) because a proxy server has not yet been selected (step 230). The High_Speed variable is also initiated and also set to 0 (zero) since no proxy speeds have been received (step 240). For-Next loop 250 is started to test all of the proxy servers available. The first proxy server from the list read (see input 210) is tested to determine the speed at which the proxy server is returning requests (step 255). The speed test can be a proxy request that is returned with the time delay measured to determine a speed. The speed test can also be implemented by requesting information from the proxy server regarding the proxy server's current status, including its throughput speed. The proxy server can then return the information to the client computer system. Once the speed has been received from the proxy server, the speed is compared against the fastest known proxy server (decision 260). The first proxy server will, unless unavailable, be faster than the initial high speed value of 0 set in step 240. If the speed is greater than the fastest known proxy server speed, "yes" branch 265 is taken. "Yes" branch 265 changes the proxy selected variable to the address of the proxy server being tested (step 270), and also resets the High_Speed variable (step 275) to the speed that was a returned during the speed test in step 255 before looping to process the next proxy server (loop termination 285). On the other hand, if the speed returned in step 255 is not greater than the fastest currently known proxy server, "no" branch 280 is taken which loops to the next proxy server (loop termination 285). The list of proxy servers is processed by loop 250 until fully processed, at which time loop 250 terminates and processing is terminated at termination step 295.

Figure 3:
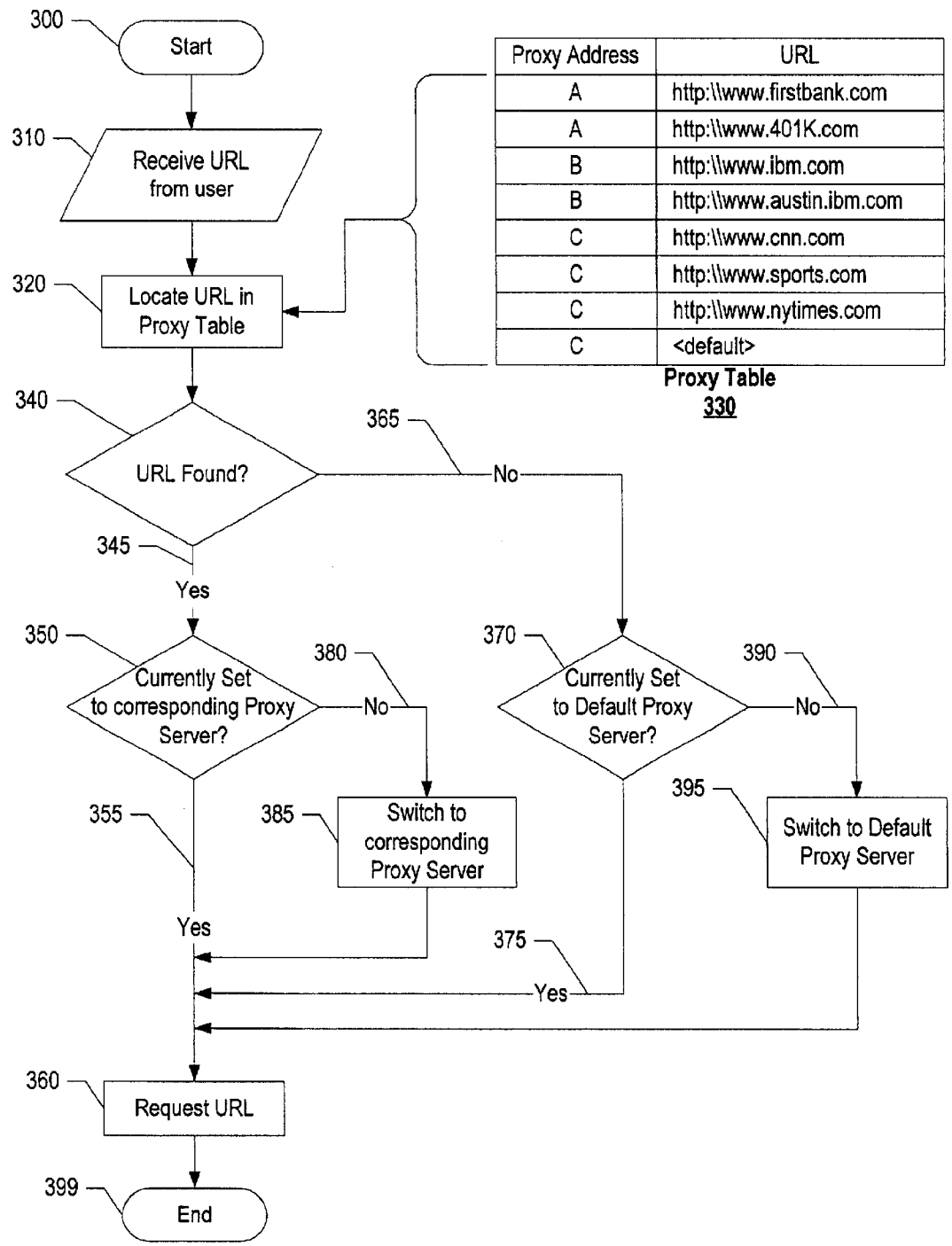
FIG. 3 is a flowchart of a client computer choosing a proxy server based upon corresponding URLs from a proxy table.

FIG. 3 shows a flowchart of one embodiment of selecting a proxy server based upon the destination address (i.e., web address, URL, etc.) being sought by the user. Processing commences at 300 whereupon a requested address is received from the user (input 310). The requested address is the ultimate address being sought, not the proxy server address. Proxy table 330 is provided to store network addresses (i.e., web address, URL, etc.) and corresponding proxy servers the user wishes to use to access the network address. There may be several reasons why a user wishes to use a particular proxy server to access a particular network address. For example, one proxy server may provide heightened security measures and may be preferred for confidential information. Proxy address "A" in proxy table 330 corresponds to web sites that provide the user with confidential information (an online bank site and an online retirement account site). Another example for using a particular proxy server is in order to access pages that the proxy server has cached. Receiving cached pages from a proxy server is faster than receiving the actual page from the web server. Another reason for selecting a particular proxy server would be that the server is generally faster than other proxy servers. In the example shown, proxy address "B" corresponds with a company proxy server that can provide the user with more cached pages when the user is requesting company-oriented documents. Proxy address "C" is shown being a more general purpose proxy server. This server is the default server and is also the server corresponding with general use sites, such as news and sports sites. The destination address can also be identified using wildcard characters so that all web sites with addresses that include the string "IBM" use a particular proxy server, while all those that include the string "bank" use another proxy server.

After the desired network address is received from the user (input 310), proxy table 330 is searched for a matching address (step 320). If the address is found, decision 340 branches to "yes" branch 345. A check is made as to whether the current proxy server matches the proxy server located in proxy table 330 (decision 350). If the current proxy server matches the proxy server located in proxy table 330, "yes" branch 355 is taken and the address is requested from the proxy server (step 360). On the other hand, if the current proxy server does not match the proxy server located in proxy table 330, "no" branch 380 is taken and the client computer switches its configuration settings (step 385) to identify the proxy server located in proxy table 330 before the request is sent to the web server (step 360).

If the destination address was not found in proxy table 330, decision 340 branches to "no" branch 365 in order to use the default proxy server. The current proxy server address is compared with the default proxy server address (decision 370). If the addresses match, "yes" branch 375 is taken and the request is sent to the web server. On the other hand, if the addresses do not match, "no" branch 390 is taken and the client computer switches its configuration settings (step 395) to the default proxy server before the request is sent to the web server (step 360). In some embodiments, the default proxy server is set to equal the current proxy server so additional switching to default proxy servers is not needed.

After the request is sent to the web server (step 360), the selecting processing terminates at 399.

Figure 4:
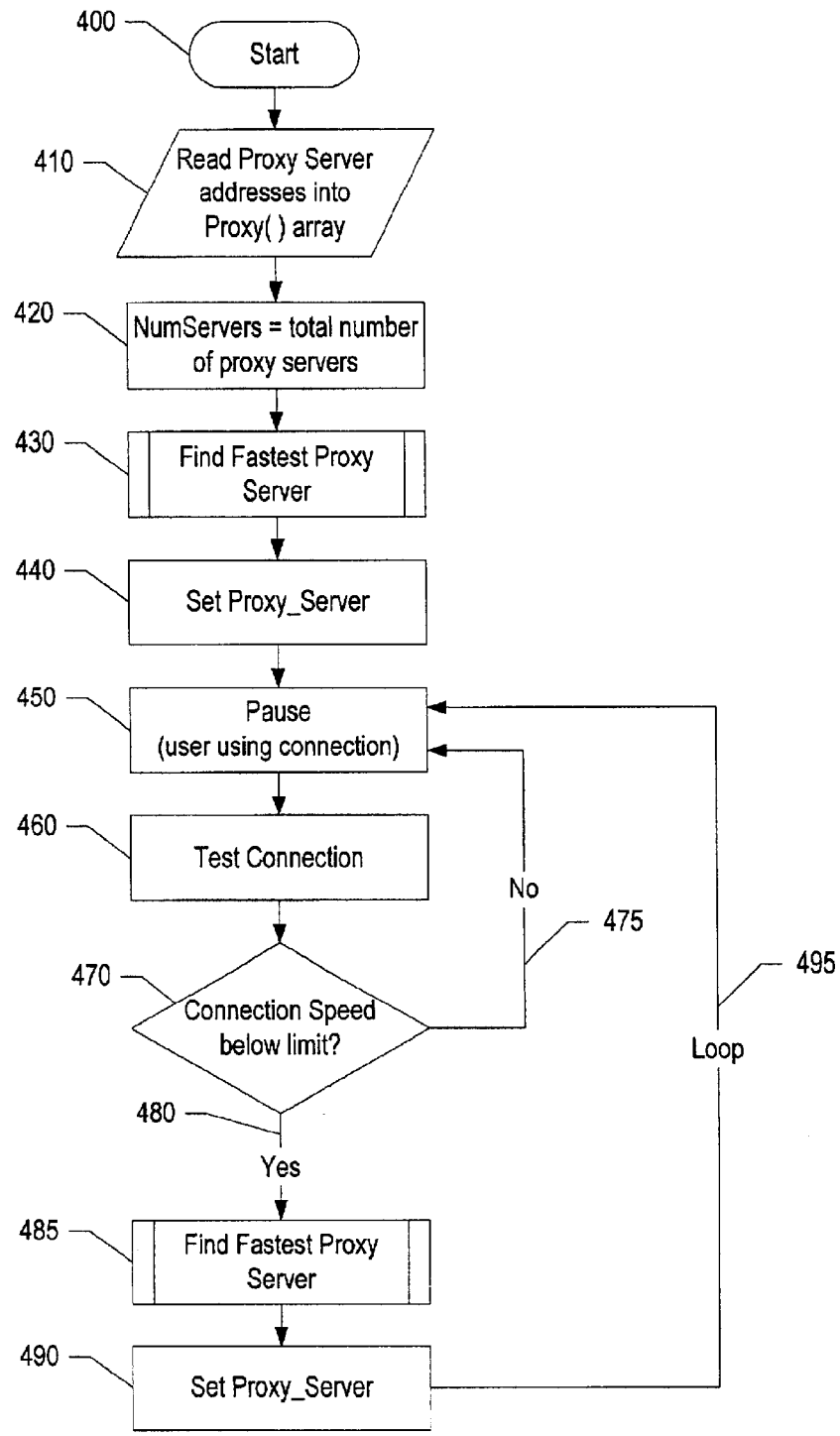
FIG. 4 is a flowchart of a client computer repetitively choosing proxy servers based upon intermittent speed tests.

FIG. 4 shows a flowchart for selecting a proxy server based upon the current speed of the proxy server. The logic shown in FIG. 4 differs from that shown in FIG. 2 in that FIG. 2 established a proxy server based on proxy server speed during startup, while FIG. 4 iteratively tests the current proxy server speed against a threshold, or limit, and changes the proxy server when the limit is breached. Processing commences at 400 whereupon the proxy server addresses are read (input 410) into an array. The number of proxy servers is then determined (step 420) before the fastest proxy server is identified (predefined step 430). Predefined step 430 is substantially similar to proxy server selection loop shown in FIG. 2, steps 230 to 285. The result of predefined step 430 is the address of the fastest proxy server which is set at step 440.

In order to intermittently test the proxy server speed, the processing is paused for a predetermined amount of time (step 450) while the user continues to use the connection to make network requests. When the pause period is over, the current connection is tested (step 460) to determine whether the current proxy server speed has fallen below a given threshold. If the connection speed is too slow, decision 470 branches to "yes" branch 480 whereupon the fastest proxy server is once again determined (predefined step 485) and the faster server address is set, or configured, in the client computer system (step 490) before looping (loop 495) back to the pause operation (step 450). On the other hand, if the connection speed of the current proxy connection is not too slow (below the threshold), "no" branch 475 is taken looping back to the pause operation (step 450).

Figure 5:
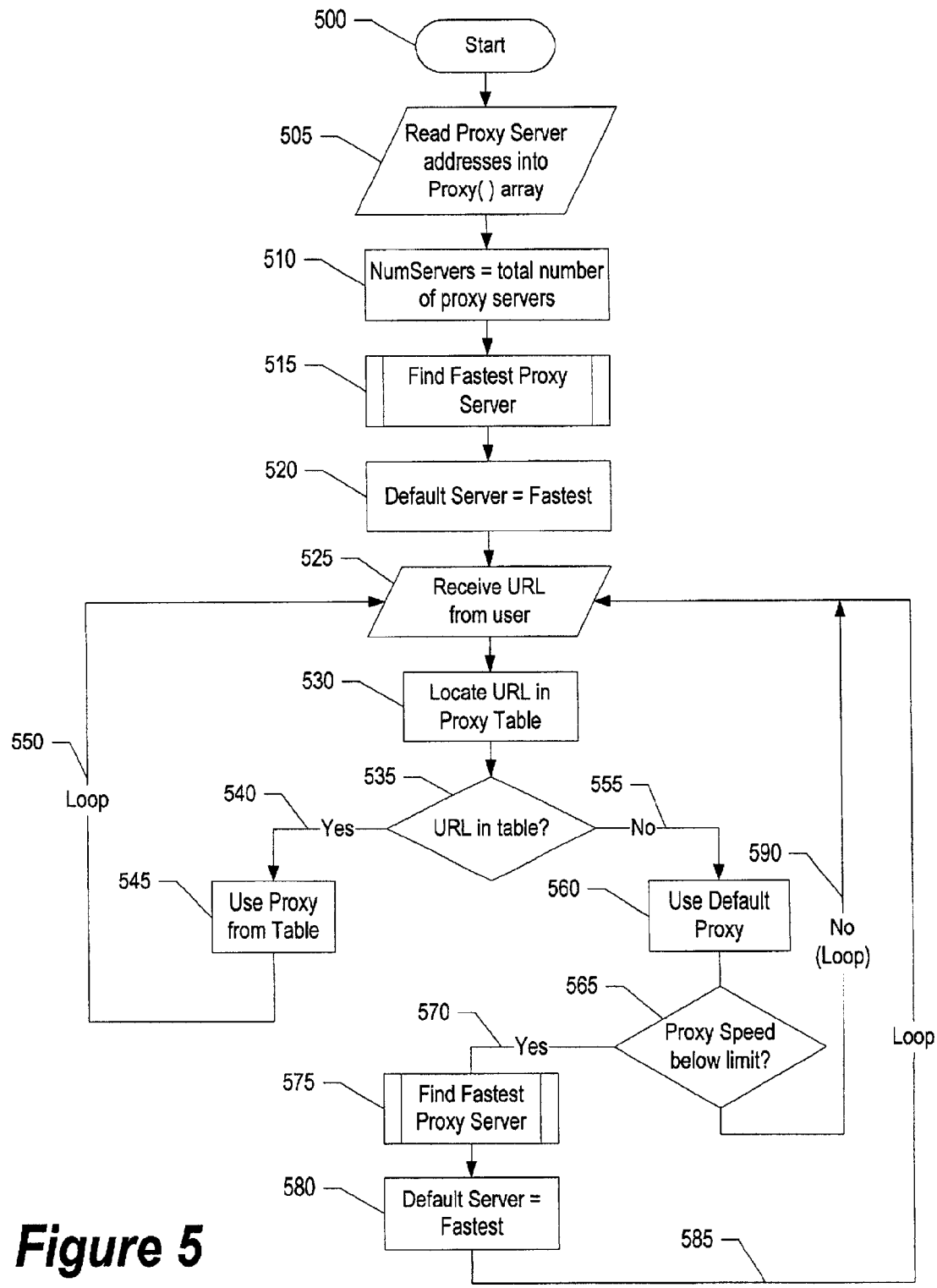
FIG. 5 is a flowchart of a client computer choosing a proxy server based upon a combination of speed and destination (URL) address.

FIG. 5 shows a flowchart that includes proxy speed attributes as well as a proxy table selector. Processing commences at 500 whereupon the proxy server addresses are read (input 505) and stored in an array. The total number of proxy servers available to the client computer is determined (step 510). The fastest proxy server from the list of proxy servers is then determined (predefined process 515) and the fastest proxy server is set to be the default proxy server (step 520). A network request, which includes the web server address, is received from the user (input 525). The proxy table (see FIG. 3) is searched for the web address provided by the user (step 530). If the address was found in the proxy table, decision 535 branches to "yes" branch 540 whereupon the network request is made using the corresponding proxy server (step 545) before looping back (loop 550) to receive the next network address from the user (step 525). On the other hand, if the network address is not in the proxy table, decision 535 branches to "no" branch 555 whereupon the default proxy server is used make the request (step 560). The connection speed of the default proxy server is periodically measured and compared against a predefined limit. If the proxy speed is below the limit, "yes" branch 570 is taken whereupon the fastest proxy server from the list is again identified (predefined process 575) and the default proxy server is set to the fastest proxy server (step 580) befor looping (loop 585) back to receive the next address from the user at step 525.

Figure 6:
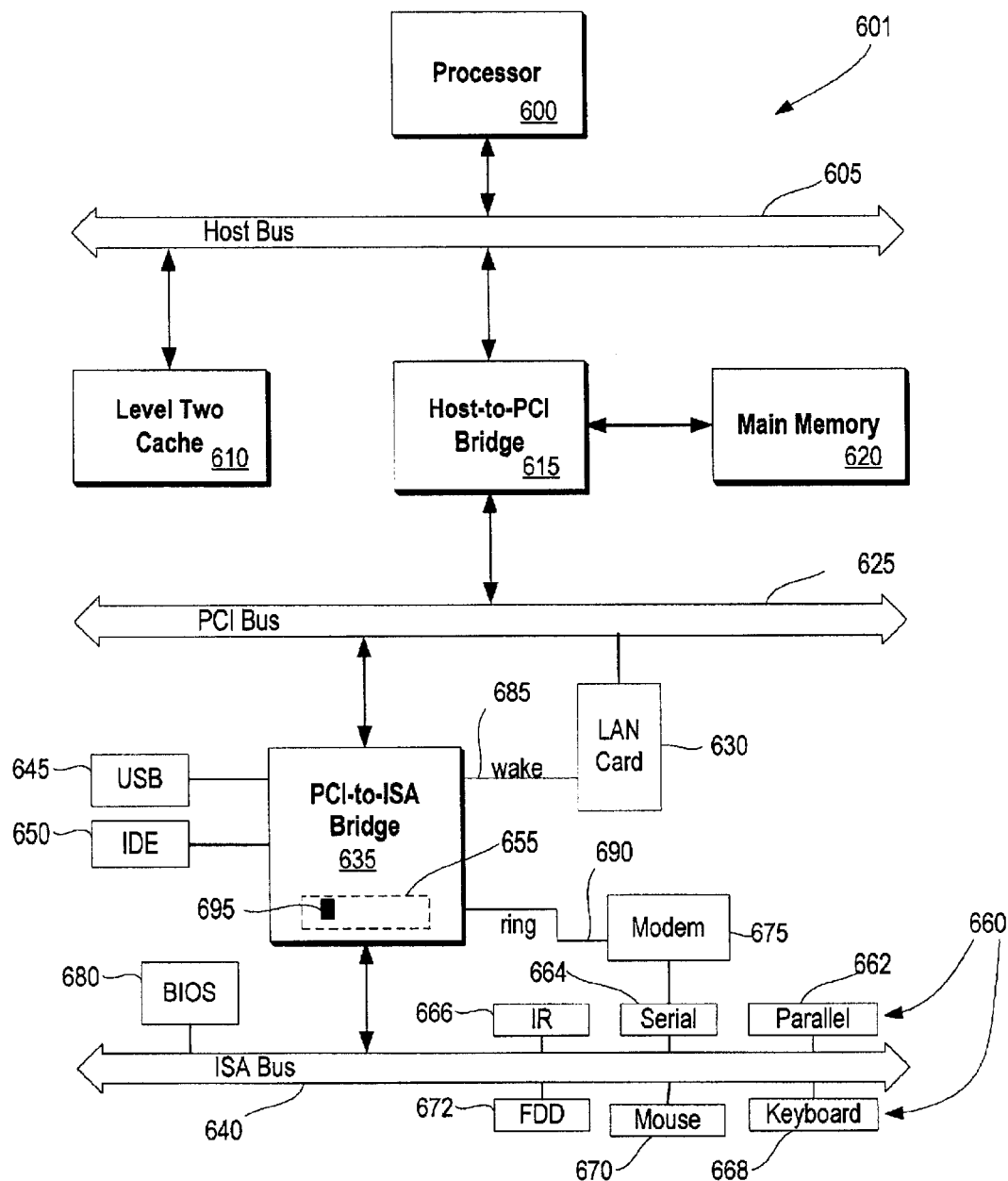
FIG. 6 is a block diagram of an information handling system capable of implementing the present invention.

FIG. 6 illustrates information handling system 601 which is a simplified example of a computer system capable of performing the present invention. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between. PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (FDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 another computer system to copy files over a network, LAN card 630 is coupled to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the copying processes described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for selecting a proxy server, said method comprising:
   identifying a plurality of proxy servers; and
   automatically determining at least one of the proxy servers to use when accessing a network wherein the automatically determining further includes:
   receiving a URL destination address from a client computer system; and
   comparing the destination address to a plurality of network addresses, each of the network addresses corresponding with a proxy server identifier, wherein at least one of the network addresses includes one or more wildcard characters, the wildcard characters identifying more than one address corresponding to the network address.

2. The method as described in claim 1 wherein the automatically determining further comprises:
   testing a speed for each of the plurality of proxy servers; and
   determining a highest speed.

3. The method as described in claim 1 wherein the automatically determining further comprises:
   setting a minimum speed limit for a selected proxy server;
   comparing a speed for the selected proxy server with the minimum speed limit; and
   testing each of the plurality of proxy servers in response to the speed for the selected proxy server falling below the minimum speed limit.

4. The method as described in claim 1 further comprising:
   returning the proxy server identifier corresponding to the network address that matches the received destination address.

5. The method as described in claim 1 further comprising:
   returning a default proxy server identifier in response to the received destination address not matching any of the network addresses.

6. The method as described in claim 1 further comprising:
   modifying a proxy configuration setting using the selected proxy server identifier, the proxy configuration setting identifying the proxy server used by a client computer system.

7. The method as described in claim 1 wherein the identifying further comprises:
   reading a proxy server identifier associated with each of the proxy servers.

8. The method as described in claim 1 wherein the identifying further comprises:
   connecting to a second computer system using a network; and
   receiving a plurality of proxy server identifiers from the second computer system.

9. The method as described in claim 1 further comprising:
   determining a fastest proxy server from the plurality of proxy servers;
   setting a default proxy server address to the address of the fastest proxy server;
   receiving a destination address from a user;
   locating the destination address in a proxy table, the proxy table including one or more network addresses and a proxy server identifier corresponding with each network address;
   selecting the proxy server identifier corresponding with the network address in response to locating the destination address in the proxy table; and
   selecting the default proxy server address in response to not locating the destination address in the proxy table.

10. An information handling system comprising:
    one or more processors;
    a memory accessible by the processors;
    a nonvolatile storage device accessible by the processors;
    a network interface connecting the information handling system to a computer network; and
    a proxy selection tool, the proxy selection tool including:
    means for reading a plurality of proxy server identifiers;
    means for evaluating at least one of the proxy servers;
    means for selecting one of the plurality of proxy server identifiers in response to the evaluating,
    wherein the proxy selection tool further includes:
       means for receiving a destination address; and
       means for comparing the destination address to a plurality of network addresses, each of the network addresses corresponding with a proxy server identifier, wherein at least one of the network addresses includes one or more wildcard characters, the wildcard characters identifying more than one address corresponding to the network address.

11. The information handling system as described in claim 10 wherein the proxy selection tool further comprises:
   means for testing a speed for each of the plurality of proxy servers; and
   means for determining a highest speed.

12. The information handling system as described in claim 10 wherein the proxy selection tool further comprises:
   means for setting a minimum speed limit for a selected proxy server;
   means for comparing a speed for the selected proxy server with the minimum speed limit; and
   means for testing each of the plurality of proxy servers in response to the speed for the selected proxy server falling below the minimum speed limit.

13. The information handling system as described in claim 10 wherein the proxy selection tool further comprises:
   means for returning the proxy server identifier corresponding to the network address that matches the received destination address.

14. The information handling system as described in claim 10 wherein the proxy selection tool further comprises:
   means for returning a default proxy server identifier in response to the received destination address not matching any of the network addresses.

15. The information handling system as described in claim 10 wherein the proxy selection tool further comprises:
   means for modifying a proxy configuration setting using the selected proxy server identifier, the proxy configuration setting identifying the proxy server used by a client computer system.

16. The information handling system as described in claim 10 wherein the proxy selection tool further comprises:
   means for determining a fastest proxy server from the plurality of proxy servers;
   means for setting a default proxy server address to the address of the fastest proxy server;
   means for receiving a destination address from a user;
   means for locating the destination address in a proxy table, the proxy table including one or more network addresses and a proxy server identifier corresponding with each network address;
   means for selecting the proxy server identifier corresponding with the network address in response to locating the destination address in the proxy table; and
   means for selecting the default proxy server address in response to not locating the destination address in the proxy table.

17. A computer program product for selecting a proxy server, said computer program product comprising:
   means for reading a plurality of proxy server identifiers;
   means for evaluating at least one of the proxy servers;
   means for selecting the proxy server identifier corresponding to one of the evaluated proxy servers,
   wherein the means for evaluating further includes:
      means for receiving a destination address; and
      means for comparing the destination address to a plurality of network addresses, each of the network addresses corresponding with a proxy server identifier, wherein at least one of the network addresses includes one or more wildcard characters, the wildcard characters identifying more than one address corresponding to the network address.

18. The computer program product as described in claim 17 wherein the means for evaluating further comprises:
   means for setting a minimum speed limit for a selected proxy server;
   means for comparing a speed for the selected proxy server with the minimum speed limit; and
   means for testing each of the plurality of proxy servers in response to the speed for the selected proxy server falling below the minimum speed limit.

19. The computer program product as described in claim 17 wherein the means for evaluating further comprises:
   means for testing a speed for each of the plurality of proxy servers; and
   means for determining a highest speed.

20. The computer program product as described in claim 17 further comprising:
   means for returning the proxy server identifier corresponding to the network address that matches the received destination address.

21. The computer program product as described in claim 19 further comprising:
   means for returning a default proxy server identifier in response to the received destination address not matching any of the network addresses.

22. The computer program product as described in claim 17 further comprising:
   means for modifying a proxy configuration setting using the selected proxy server identifier, the proxy configuration setting identifying the proxy server used by a client computer system.

23. The computer program product as described in claim 17 further comprising:
   means for determining a fastest proxy server from the plurality of proxy servers;
   means for setting a default proxy server address to the address of the fastest proxy server;
   means for receiving a destination address from a user;
   means for locating the destination address in a proxy table, the proxy table including one or more network addresses and a proxy server identifier corresponding with each network address;
   means for selecting the proxy server identifier corresponding with the network address in response to locating the destination address in the proxy table; and
   means for selecting the default proxy server address in response to not locating the destination address in the proxy table.

24. A method for selecting a proxy server, said method comprising:
   identifying a plurality of proxy servers; and
   automatically determining at least one of the proxy servers to use when accessing a network, wherein the automatically determining further comprises:
      receiving a destination address; and
      comparing the destination address to a plurality of network addresses, each of the network addresses corresponding with a proxy server identifier, and
   wherein at least one of the network addresses includes one or more wildcard characters, the wildcard characters identifying more than one address corresponding to the network address.

25. The method as described in claim 24 wherein the automatically determining further comprises:
   testing a speed for each of the plurality of proxy servers; and
   determining a highest speed.

26. An information handling system comprising:
one or more processors;
a memory accessible by the processors;
a nonvolatile storage device accessible by the processors;
a network interface connecting the information handling system to a computer network; and
a proxy selection tool, the proxy selection tool including:
means for reading a plurality of proxy server identifiers;
means for evaluating at least one of the proxy servers;
means for selecting one of the plurality of proxy server identifiers in response to the evaluating,
wherein the proxy selection tool further includes:
means for receiving a destination address; and
means for comparing the destination address to a plurality of network addresses, each of the network addresses corresponding with a proxy server identifier, and
wherein at least one of the network addresses includes one or more wildcard characters, the wildcard characters identifying more than one address corresponding to the network address.

27. The information handling system as described in claim 26 wherein the proxy selection tool further comprises:
means for testing a speed for each of the plurality of proxy servers; and
means for determining a highest speed.

28. A computer program product for selecting a proxy server, said computer program product comprising:
means for reading a plurality of proxy server identifiers;
means for evaluating at least one of the proxy servers;
means for selecting the proxy server identifier corresponding to one of the evaluated proxy servers,
wherein the means for evaluating further includes:
means for receiving a destination address; and
means for comparing the destination address to a plurality of network addresses, each of the network addresses corresponding with a proxy server identifier, and
wherein at least one of the network addresses includes one or more wildcard characters, the wildcard characters identifying more than one address corresponding to the network address.

29. The computer program product as described in claim 28 wherein the means for evaluating further comprises:
means for testing a speed for each of the plurality of proxy servers; and
means for determining a highest speed.

\* \* \* \* \*